United States Patent
Hume et al.

(10) Patent No.: US 9,508,172 B1
(45) Date of Patent: Nov. 29, 2016

(54) METHODS AND DEVICES FOR OUTPUTTING A ZOOM SEQUENCE

(71) Applicant: Google Inc., Mountain View, CA (US)

(72) Inventors: Thomas Weedon Hume, Brighton (GB); Mikkel Crone Koser, Vanlose (GB); Tony Ferreira, London (GB); Jeremy Lyon, London (GB); Waldemar Ariel Baraldi, London (GB); Bryan Mawhinney, Thames Ditton (GB); Christopher James Smith, London (GB); Lenka Trochtova, London (GB); Andrei Popescu, London (GB); David Ingram, London (GB); Flavio Lerda, London (GB); Michael Ananin, London (GB); Vytautas Vaitukaitis, London (GB); Marc Paulina, London (GB)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 14/098,120

(22) Filed: Dec. 5, 2013

(51) Int. Cl.
*G09G 5/14* (2006.01)
*G06T 11/60* (2006.01)
*G06T 3/00* (2006.01)

(52) U.S. Cl.
CPC ..... *G06T 11/60* (2013.01); *G06F 2203/04806* (2013.01); *G06T 3/00* (2013.01)

(58) Field of Classification Search
CPC ................................. G06T 11/00; G06T 3/00
USPC ........................................................ 345/667
See application file for complete search history.

(56) References Cited

U.S. PATENT DOCUMENTS

| | | | | |
|---|---|---|---|---|
| 5,553,209 A | * | 9/1996 | Johnson | G06T 17/05 345/667 |
| 8,340,423 B1 | * | 12/2012 | Zelinka | G06T 3/4038 382/173 |
| 8,577,604 B1 | * | 11/2013 | Ogale | G01C 21/32 382/190 |
| 8,711,181 B1 | * | 4/2014 | Nourse | G06F 3/14 345/660 |
| 8,749,580 B1 | * | 6/2014 | Lininger | G11B 27/322 345/473 |
| 9,037,599 B1 | * | 5/2015 | Bailly | G06F 17/30241 382/285 |
| 9,047,692 B1 | * | 6/2015 | Seitz | G06T 3/4038 |
| 2001/0010546 A1 | * | 8/2001 | Chen | H04N 5/23293 348/218.1 |
| 2008/0063280 A1 | * | 3/2008 | Hofman | G06K 9/00973 382/182 |
| 2009/0310851 A1 | * | 12/2009 | Arcas | G06T 7/0065 382/154 |
| 2011/0054770 A1 | * | 3/2011 | Allen | G01C 21/36 701/532 |

(Continued)

*Primary Examiner* — Javid A Amini
(74) *Attorney, Agent, or Firm* — Troutman Sanders LLP; James E. Schutz; Scott D. Barnett

(57) ABSTRACT

Certain embodiments of this disclosure include methods and devices for outputting a zoom sequence. According to one embodiment, a method is provided. The method may include: (i) determining first location information from first metadata associated with one or more images, wherein the first location information identifies a first location; and (ii) outputting, for display, a first zoom sequence based on the first location information, wherein the first zoom sequence may include a first plurality of mapped images of the first location from a first plurality of zoom levels and the plurality of mapped images are sequentially ordered by a magnitude of the zoom level.

20 Claims, 5 Drawing Sheets

(56) References Cited

U.S. PATENT DOCUMENTS

| | | | |
|---|---|---|---|
| 2011/0288962 A1* | 11/2011 | Rankin, Jr. | G06F 17/30525 705/27.1 |
| 2011/0289161 A1* | 11/2011 | Rankin, Jr. | G06Q 10/107 709/206 |
| 2011/0313649 A1* | 12/2011 | Bales | G01C 21/367 701/455 |
| 2013/0088519 A1* | 4/2013 | Cristescu | G06T 3/40 345/667 |
| 2013/0147842 A1* | 6/2013 | Zhu | G09G 5/373 345/636 |
| 2013/0148471 A1* | 6/2013 | Brown | G01S 15/8902 367/88 |
| 2013/0330055 A1* | 12/2013 | Zimmermann | G06F 17/30817 386/240 |
| 2014/0219636 A1* | 8/2014 | Shah | H04N 9/87 386/282 |
| 2014/0258867 A1* | 9/2014 | Yang | G06F 3/0484 715/723 |
| 2014/0340395 A1* | 11/2014 | Mattila | H04N 13/0207 345/420 |
| 2015/0138245 A1* | 5/2015 | Lee | A61B 8/44 345/667 |
| 2015/0154784 A1* | 6/2015 | Hensel | G06T 3/20 345/672 |

* cited by examiner

METHODS AND DEVICES FOR OUTPUTTING A ZOOM SEQUENCE

BACKGROUND

Digital photograph and video files frequently include additional data beyond mere pixel data. This additional data, referred to as photo metadata, often includes location information indicating the geographic location (i.e., the physical, real-world location) of capture. This location information may include, for example, latitudinal and longitudinal coordinates (e.g., 37.423512, −122.08114). Associating such location information with an image file (by, e.g., including the location information within an image file generated based on a captured image) is known as "geotagging." Although the preceding example discussed location information expressed in terms of latitudinal and longitudinal coordinates, location information may take any number of suitable forms. For instance, location information may also be suitably expressed in terms of municipality information (e.g., city, state, and country), in terms of a time zone (e.g., United States Central Standard Time), or using any other convention for describing a geographic location.

Furthermore, it is often desirable to "set the scene" when sharing or presenting captured photographs or video in order to lend context to the image data that follows. Often, this "scene-setting" functionality has been accomplished by introductory or prologue information such as a title slide preceding a photograph slideshow. Although such introductory information may indicate where the ensuing images were taken, it is often presented in an uninteresting or unengaging fashion. In the photograph slideshow scenario, title slides rarely contextualize the location captured in the image relative to known landmarks.

Accordingly, there is a need for a new technology aimed at addressing one or more of the drawbacks associated with conventional techniques for "setting the scene" of a photograph/video presentation.

SUMMARY

The instant disclosure describes methods and devices for outputting a zoom sequence in order to "set the scene" (i.e., illustrate the location where photographs or video were captured) for a photograph and/or video presentation (e.g., a photo slideshow, montage, etc.). To this end, in one example, a method is provided. The method includes determining first location information from first metadata associated with one or more images. The first location information may identify a first location (i.e., a physical, real-world location on Earth). The method may also include outputting, for display, a first zoom sequence based on the first location information. The first zoom sequence may include a first plurality of mapped images of the first location from a first plurality of zoom levels, sequentially ordered by a magnitude of the zoom level.

In one example, the method may additionally include outputting, for display, the one or more images. In another example, the method may additionally include determining second location information from second metadata associated with different one or more images. In this example, the second location information may identity a second location (i.e., a location that is different from the first location discussed above). Continuing, in this example, the method may also include outputting, for display, a second zoom sequence based on the second location information. The second zoom sequence may include a second plurality of mapped images of the second location from a second plurality of zoom levels, sequentially ordered by a magnitude of the zoom level. In still another example, this method may include outputting, for display, the different one or more images.

In one example of the method, the second plurality of zoom levels is the same as the first plurality of zoom levels. In another example of the method, each zoom level of the plurality of zoom levels is associated with a different magnification. In still another example, the method may include the additional step of compiling a slideshow presentation. The complied slideshow presentation may include the one or more images and the first zoom sequence (not necessarily in that order). In this example, the compiling may include inserting the one or more images and the first zoom sequence into a single digital file. As used herein, "inserting" may include adding to an existing file, and combining or aggregating from multiple sources into a new file.

According to another embodiment, a computing device is provided. The computing device may include, at least, a location information determining module and a zoom sequence generating module operatively coupled to the location information determining module. In this example embodiment, the location information determining module may be configured to determine first location information from first metadata associated with one or more images. In this example, the first location information may identify a first location (i.e., a physical, real-world location on Earth). The zoom sequence generating module may be configured to output, for display, a first zoom sequence based on the first location information. The first zoom sequence may include a first plurality of mapped images of the first location from a first plurality of zoom levels, sequentially ordered by a magnitude of the zoom level.

In another example embodiment, a non-transitory computer-readable medium encoded with a computer program is provided. The computer program may include executable instructions that when executed by a computing device having at least one processor causes the computing device to perform a method. According to the method, first location information may be determined from first metadata associated with one or more images, wherein the first location information identifies a first location. Further, according to this method, a first zoom sequence based on the first location information may be output for display. The first zoom sequence may include a first plurality of mapped images of the first location from a first plurality of zoom levels, sequentially ordered by a magnitude of the zoom level.

These and other objects, features, and advantages of the foregoing method, system, and computer program product will become more apparent upon reading the following specification in conjunction with the accompanying drawing figures

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

This disclosure provides example methods, devices, systems, and articles of manufacture for outputting a zoom sequence. In one example, a method includes: (i) determining first location information from first metadata associated with one or more images, wherein the first location information identifies a first location and (ii) outputting, for display, a first zoom sequence based on the first location information, wherein the first zoom sequence comprises a first plurality of mapped images of the first location from a first plurality of zoom levels, and wherein the plurality of mapped images are sequentially ordered by a magnitude of the zoom level.

Figure 1:
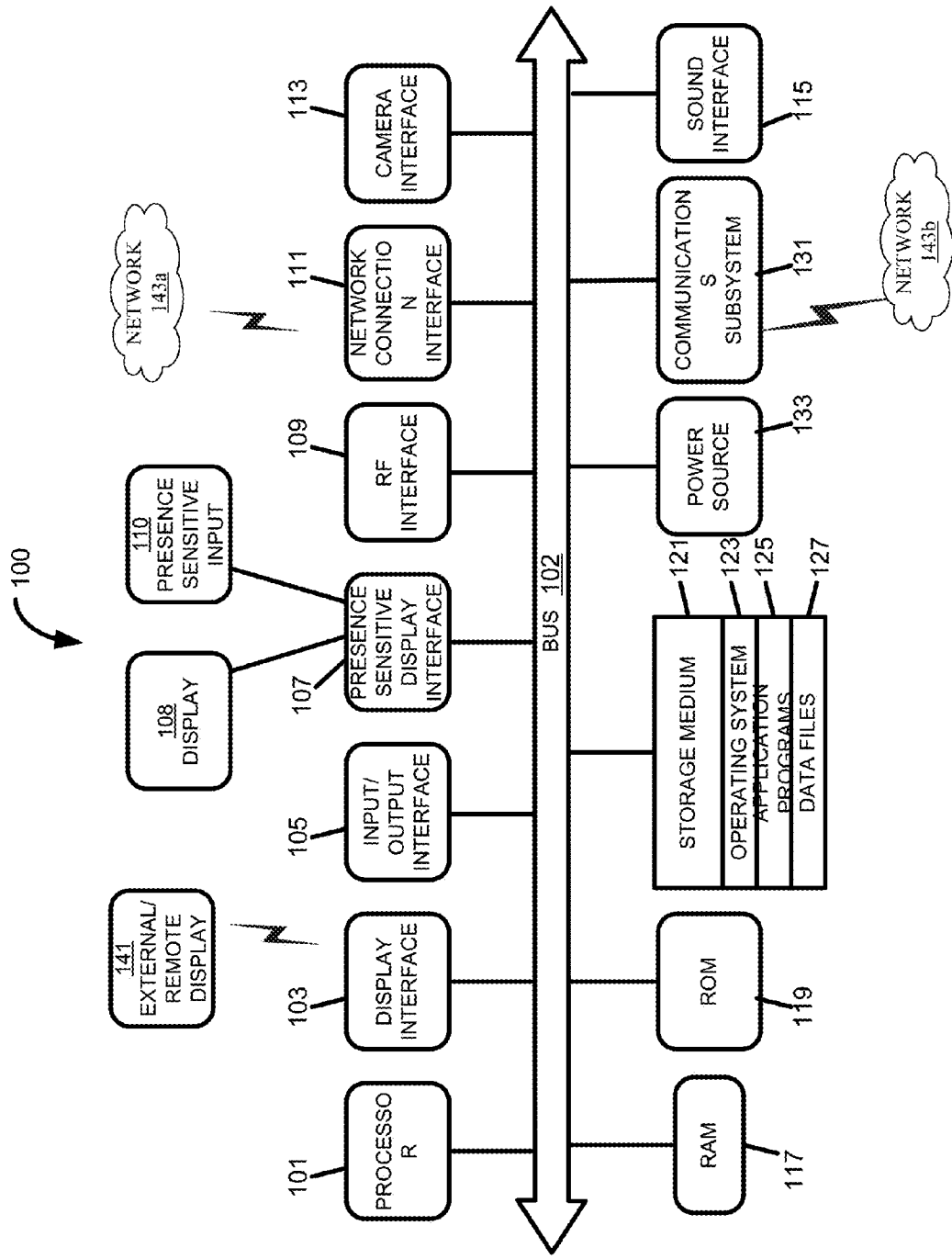
FIG. 1 is a block diagram illustrating one embodiment of a computing device suitable for use in outputting a zoom sequence in accordance with various aspects set forth herein.

According to one example implementation, the terms computing device or mobile computing device, as used herein, may be a central processing unit (CPU), controller or processor, or may be conceptualized as a CPU, controller or processor (for example, the processor 101 of FIG. 1). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over Wi-Fi) such as a TV or an external computing system.

FIG. 1 is a block diagram illustrating one embodiment of a computing device 100 in accordance with various aspects set forth herein. In FIG. 1, the computing device 100 may be configured to include a processor 101, which may also be referred to as a computing device, that is operatively coupled to a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia interface (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the mobile computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive input device, a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with a display to form a presence-sensitive display. Further, the presence-sensitive input device may be coupled to the computing device. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a display 108 or a presence sensitive input 110. In one definition, a presence-sensitive display is an electronic visual display that may detect the presence and location of a touch, gesture, or object near its display area. In one definition, a presence-sensitive input may be a device that accepts input by the proximity of a finger, a stylus, or an object near the device, such as a touch screen. In one definition, the term "near" means on, proximate or associated with. In another definition, the term "near" is the extended spatial location of. The RF interface 109 may be configured to provide a communication interface to RF components such as a transmitter, a receiver, and an antenna. The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The network 143a and the network 143b may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a non-transitory computer-readable medium.

Figure 2:
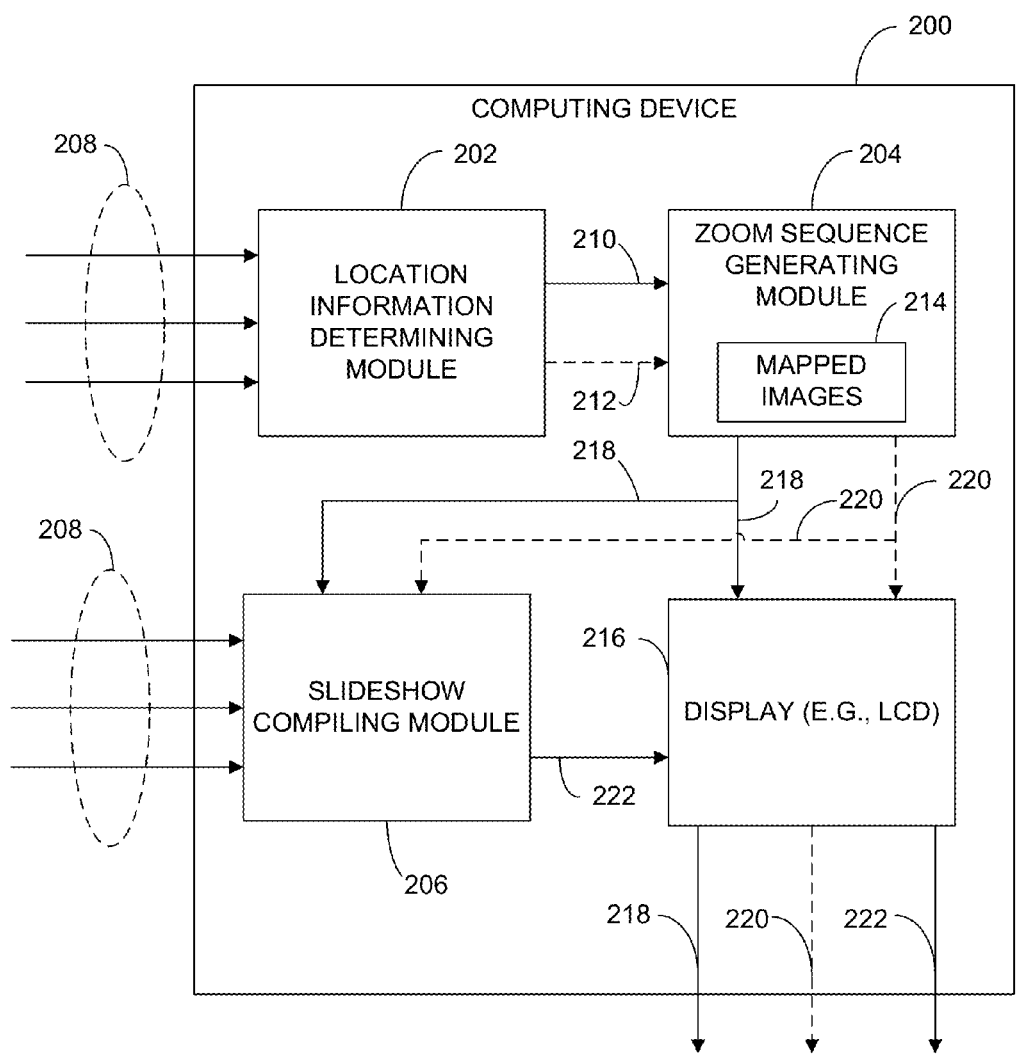
FIG. 2 is a block diagram illustrating another example of a computing device suitable for use in outputting a zoom sequence in accordance with various aspects set forth herein.

Referring now to FIG. 2, a block diagram illustrating another example of a computing device 200 for implementing the teachings of the disclosed technology is provided. While the computing device 200 is discussed generically as to its functionality, it is noted that the computing device 200 may be implemented physically as the computing device 100 previously discussed. The computing device 200 includes a location information determining module 202, a zoom sequence generating module 204, a slideshow compiling module 206, and a display 216. While the slideshow compiling module 206 and the display 216 are shown as part of the computing device 200 in the illustrated embodiment, these components 206, 216 are not required for the operation of the computing device 200. Further, while the components 202, 204, 206, and 216 are shown in FIG. 2 as part of a single computing device 200, those having ordinary skill will recognize that one or more of these components may exist external to the computing device 200 without losing the functionality described herein. For example, one or more of the components 202, 204, 206, and 216 may exist externally to the computing device 200, but nonetheless interact with the components internal to the computing device 200 via networked communication (e.g., wired or wireless communication).

In operation, the location information determining module 202 may obtain one or more images 208. As used herein, "obtaining" may include fetching/retrieving the image(s) 208 or receiving/accepting the image(s) 208. In one example, the one or more images 208 include one or more digital images (e.g., digital photograph(s)). In this example, each image of the one or more images 208 may include metadata, which provides additional information about the image(s) beyond mere pixel data. The location information determining module 202 is configured to determine location information from the metadata associated with the one or more images 208. As used herein, determining location information may include parsing (i.e., analyzing) the metadata associated with each image to ascertain where each image was captured.

By way of example and not limitation, the location information determining module 202 may parse metadata associated with a digital photograph of Navy Pier in Chicago, Ill. The metadata may indicate that the photograph was taken in a particular location, i.e., Chicago, Ill. in this example. In this manner, the location information determining module 202 is operative to ascertain location information from the metadata, whereby the location information identifies a real-world location (i.e., a physical location on Earth). Moreover, and as noted above, the location information may take any number of suitable formats. For example, the location information may be expressed in terms of latitudinal and longitudinal coordinates. However, the location information may be expressed equally well in any number of conventional alternative formats.

The zoom sequence generating module 204 is configured to obtain the location information from the location information determining module 202. For example, the zoom sequence generating module 204 may obtain first location information 210 identifying a common location where one or more images were captured. Additionally, the zoom sequence generating module 204 may obtain second location information 212 identifying a different, common location where different one or more images were captured. By way of example, the first location information 210 may indicate that the certain images were all taken in Chicago, Ill. In contrast, the second location information 212 may be associated with different one or more images that were taken in a different location, such as Detroit, Mich. Regardless, the zoom sequence generating module 204 is configured to output, for display, one or more zoom sequences based on the location information. For example, the zoom sequence generating module 204 may output, for display, a first zoom sequence 218 based on the first location information 210. Additionally, the zoom sequence generating module 204 may output, for display, a second zoom sequence 220 based on the second location information 212. As used herein, a "zoom sequence" includes a plurality of mapped images of a particular location from a plurality of zoom levels. This functionality is best understood with regard to FIG. 4 herein.

Figure 4:
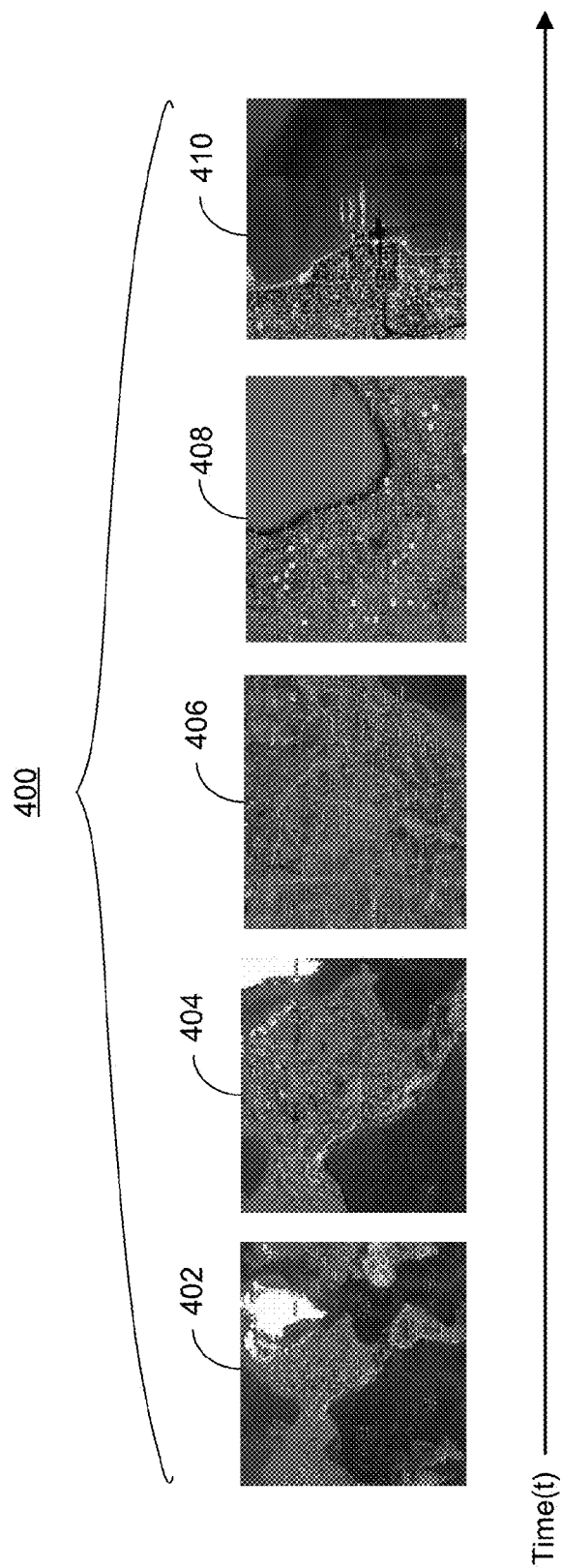
FIG. 4 is a graph illustrating the composition of an example zoom sequence including one or more mapped images in accordance with various aspects set forth herein.

Referring briefly to FIG. 4, a graph illustrating the composition of an example zoom sequence 400 (e.g., the first zoom sequence 218) including one or more mapped images 402-410 is shown. A zoom sequence may include a video made up of mapped images of a particular location from a variety of zoom levels (i.e., magnifications). For example, and with continued reference to FIG. 4, a zoom sequence 400 generated based on the location "Chicago, Ill." is provided. The mapped image 402 shows Chicago from a first zoom level. Mapped image 404 shows Chicago from a second zoom level, which exhibits a much greater magnification (or magnitude) than the first zoom level. For example, the first zoom level associated with mapped image 402 shows Chicago, as well as South America, Africa, Europe, and Asia. In contrast, the second zoom level associated with mapped image 404 only shows Chicago and the rest of North America.

Continuing, mapped image 406 shows Chicago from a third zoom level that exhibits a greater magnification than the first and second zoom levels previously discussed. Mapped image 408 shows Chicago from a fourth zoom level that exhibits a greater magnification than the first, second, and third zoom levels previously discussed. Finally, mapped image 410 shows Chicago from a fifth zoom level that exhibits a greater magnification than the first, second, third, and fourth zoom levels. In this manner, the zoom sequence 400 may include a plurality of mapped images 402-410 of a particular location (e.g., Chicago) exhibiting progressively greater (or lesser) magnification. Thus, a zoom sequence may be generated to zoom-in to a particular location, or zoom-out of a particular location, in order to lend context to where one or more images were captured.

Returning to FIG. 2, the zoom sequence generating module 204 is configured to generate a given zoom sequence (e.g., zoom sequence 218) using a plurality of mapped images 214. As used herein, generating a zoom sequence may include compiling a plurality of mapped images of a particular location from a plurality of zoom levels. The plurality of mapped images in the zoom sequence are sequentially ordered by magnitude of the zoom level of the images. With regard to the Chicago, Ill. example, this may include compiling a plurality of images of Chicago from a plurality of progressively greater/lesser magnification levels. In one example, the mapped images 214 include images of each location on Earth from a variety of different magnification levels to ensure that a zoom sequence may be generated for any location on Earth. Furthermore, while the mapped images 214 are illustrated as part of the zoom sequence generating module 204, those having ordinary skill will recognize that the mapped images 214 may be stored in any suitable location (and in any suitable storage device, e.g., memory), such as within memory on a server computer operatively coupled to the zoom sequence generating module 204 over one or more communication networks.

In any event, once a zoom sequence (e.g., the first zoom sequence 218 and/or the second zoom sequence 220) is generated, it may be output for display. In one example, this may include outputting the zoom sequence to a display device, such as display device 216. The display device may include any suitable, conventional display device, such as the types of display devices discussed above with regard to FIG. 1. Techniques for outputting image data to a display device are well known. Alternatively, or additionally, a zoom sequence (e.g., zoom sequence 218 and/or 220) may be provided to the slideshow compiling module 206.

The slideshow compiling module 206 is configured to compile a slideshow presentation 222 that includes one or more of the images 208 and a zoom sequence (e.g., zoom sequence 218 and/or 220). In one example, compiling the slideshow presentation 222 may include inserting the one or more images 208 and one or more zoom sequences into a single digital file. In one example, the slideshow compiling module 206 may insert the image(s) and zoom sequence(s) into a single digital file by arranging the image(s) and zoom sequence(s) in a particular order and saving the combination of image(s) and zoom sequence(s) as a single digital video file. In another example, the slideshow compiling module 206 may insert the image(s) and zoom sequence(s) into a single digital file by generating a PowerPoint presentation, or the like, whereby the image(s) and zoom sequence(s) may be embedded as image/video files within one or more slides of the PowerPoint presentation. The foregoing represent but two examples by which the image(s) and zoom sequence(s) may be inserted into a single digital file, however, those having ordinary skill will recognize that other, suitable means for inserting the image(s) and zoom sequence(s) into a single digital file may be equally employed. Further still, in one example, the slideshow compiling module 206 is configured to compile a slideshow presentation 222 by inserting the image(s) and zoom sequence(s) into two or more separate digital files. In one example, the slideshow presentation 222 may be provided to the display 216 for output using known techniques.

Figure 3:
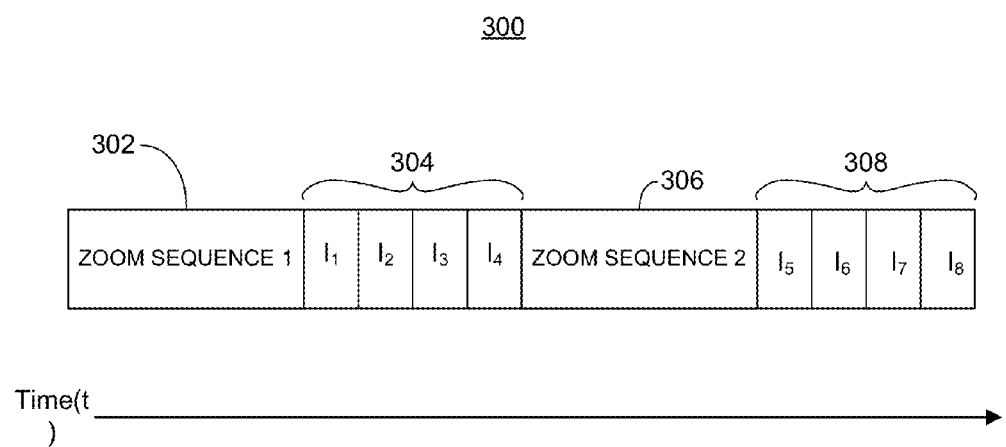
FIG. 3 is a graph illustrating the composition of a slideshow presentation including one or more zoom sequences in accordance with various aspects set forth herein.

Referring now to FIG. 3, a graph illustrating the composition of a slideshow presentation 300 including first and second zoom sequences 302, 308 is shown. In this example, the slideshow presentation 300 includes a first zoom sequence 302 followed by four separate images 304 (labeled $I_1$-$I_4$) followed by a second zoom sequence 304 followed by another four separate images 308 (labeled $I_5$-$I_8$). Although the example slideshow presentation 300 includes two zoom sequences and eight images, those having ordinary skill will appreciate that any number of zoom sequence(s) and image(s) may suitably included as part of a slideshow in accordance with the teachings of the instant disclosure. Further, while the example slideshow presentation 300 illustrates a particular ordering of zoom sequences and images, it is recognized that any suitable ordering could be equally employed. For example, a given slideshow presentation could begin with one or more images followed by one or more zoom sequences.

By way of example, the slideshow presentation could include first zoom sequence 302 made up of a plurality of mapped images, whereby each mapped image shows Chicago from a zoom level (e.g., progressively greater magnifications). Thus, in this example, the first zoom sequence 302 has the effect of "zooming in" on Chicago. Next, the slideshow presentation 300 could include four images (e.g., images 304) of Chicago. In this example, the zoom sequence 302 could be generated based on location information embedded in metadata associated with one or more of the images $I_1$-$I_4$. In this manner, the first zoom sequence 302 would be operative to "set the stage" for the images $I_1$-$I_4$ of Chicago that follow. Continuing, in this example, the second zoom sequence 306 could be made up of a plurality of mapped images, whereby each mapped image shows Detroit from a zoom level (e.g., progressively greater magnifications). Thus, the second zoom sequence 306 has the effect of "zooming in" on Detroit. Next, the slideshow presentation could include four images $I_5$-$I_8$. In this manner, the second zoom sequence 306 would be operative to "set the stage" for the images $I_5$-$I_8$ of Detroit that follow. While the previous example envisioned the second zoom sequence 306 zooming in on a different location than the first zoom sequence 203, in another embodiment, the second zoom sequence could "zoom out" from the same location that the first zoom sequence "zoomed in" on. Stated another way, in this example, the first zoom sequence 302 could zoom-in on a particular location while the second zoom sequence 306 zoomed-out on the same location. This functionality could be accomplished, for example, by reversing the ordering of the mapped images making up the first zoom sequence 302 to create the second zoom sequence 306. In one example, the first and second zoom sequences 302, 306 are made up of mapped images from respective, same zoom levels. In another example, the first and second zoom sequences 302, 306 are made up of mapped images from respective, zoom levels.

Figure 5:
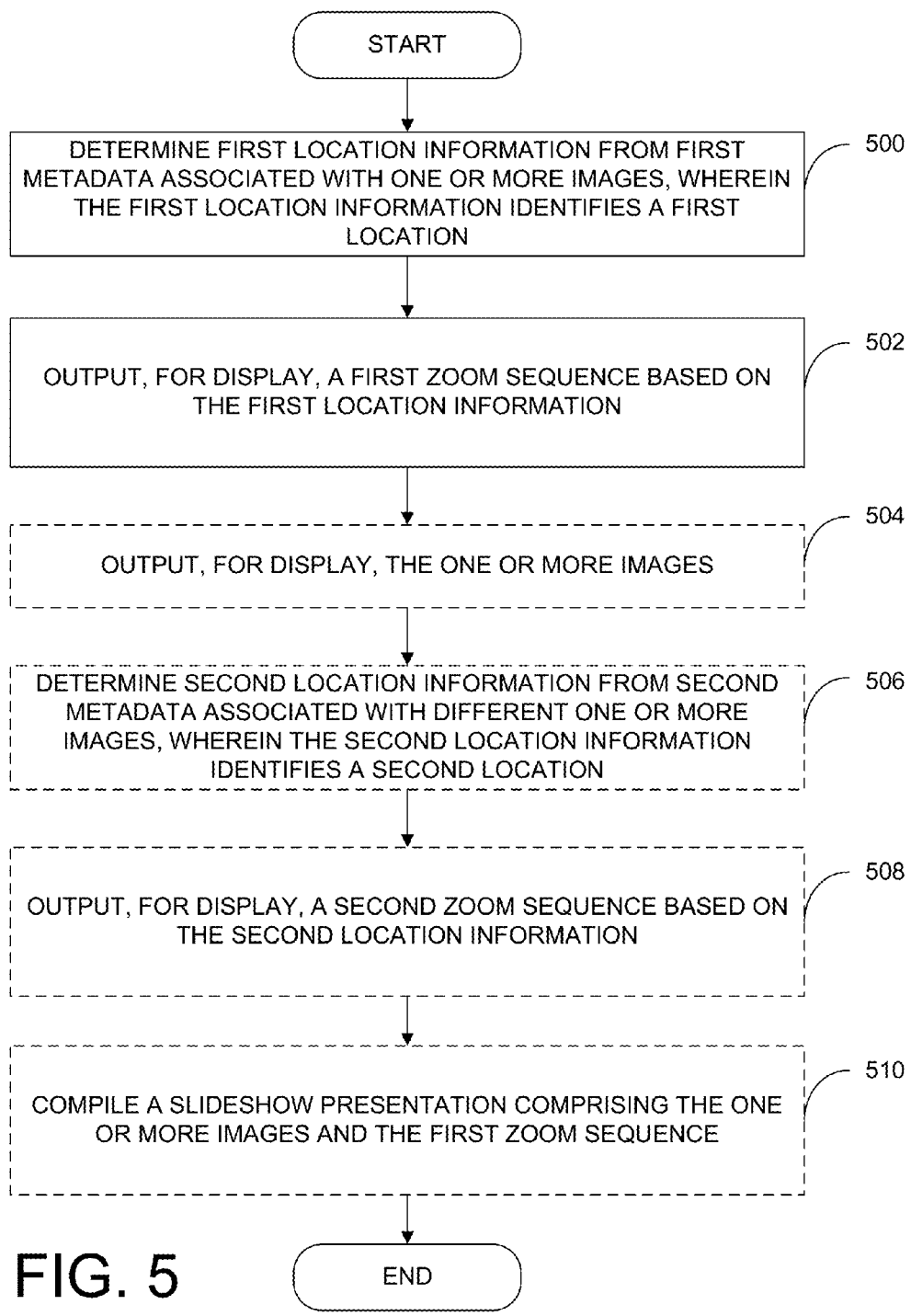
FIG. 5 is a flow chart illustrating one embodiment of a method for outputting a zoom sequence in accordance with various aspects set forth herein.

Referring now to FIG. 5, a flow chart illustrating a method for outputting one or more zoom sequences is provided. While the computing devices 100, 200 are two forms for implementing the processing described herein (including that illustrated in FIG. 5), those having ordinary skill will appreciate that other, functionally equivalent, techniques may be employed. Furthermore, some or all of the functionalities implemented via executable instructions may also be implemented using firmware and/or hardware devices such as application specific circuits (ASICs), programmable logic arrays, state machines, etc. Once again, those of ordinary skill will appreciate the wide number of variations that may be used in this manner.

Beginning at step 500, first location information is determined from first metadata associated with one or more images. The first location information may identify a first location. At step 502, a first zoom sequence is output for display based on the first location information. The first zoom sequence may include a first plurality of mapped images of the first location from a first plurality of zoom levels. The plurality of mapped images may be sequentially ordered by a magnitude of the zoom level. At optional step 504, the one or more images may be output for display. At optional step 506, second location information is determined from second metadata associated with different one or more images. The second location information may identify a second location. At optional step 508, a second zoom sequence is output for display based on the second location information. The second zoom sequence may include a second plurality of mapped images of the second location from a second plurality of zoom levels. The second plurality of mapped images may be sequentially ordered by a magnitude of the zoom level. Finally, at optional step 510, a slideshow presentation may be compiled. The slideshow presentation may include the one or more images and the first zoom sequence. Compiling the slideshow presentation may include inserting the one or more images and the first zoom sequence into a single digital file.

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used for remote device configuration. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a non-transitory computer-readable medium may include: a magnetic storage device such as a hard disk, a floppy disk, or a magnetic strip; an optical disk such as a compact disk (CD) or digital versatile disk (DVD); a smart card; and a flash memory device such as a card, stick, or key drive. Additionally, it should be appreciated that a carrier wave may be employed to carry computer-readable electronic data including those used in transmitting and receiving electronic data such as electronic mail (email) or in accessing a computer network such as the Internet or a local area network (LAN). Of course, a person of ordinary skill will recognize many modifications may be made to this configuration without departing from the scope or spirit of the claimed subject matter.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In the previous description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

It is important to recognize that it is impractical to describe every conceivable combination of components or methodologies for purposes of describing the claimed subject matter. However, a person having ordinary skill will recognize that many further combinations and permutations of the subject innovations are possible. Accordingly, the claimed subject matter is intended to cover all such alterations, modifications and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices, or articles of manufacture described herein are in conjunction with outputting zoom sequences, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A method comprising:
    determining, by a computing device, first location information from first metadata associated with one or more images, wherein the first location information identifies a first location where the one or more images were captured; and
    outputting, for display, a first zoom sequence based on the first location information,
    wherein the first zoom sequence comprises a video comprising a first plurality of mapped images of the first location from a first plurality of zoom levels, and
    wherein the plurality of mapped images are sequentially ordered by a magnitude of the zoom level.

2. The method of claim 1, further comprising:
    outputting, for display, the one or more images.

3. The method of claim 1, further comprising:
    determining second location information from second metadata associated with different one or more images, wherein the second location information identifies a second location; and
    outputting, for display, a second zoom sequence based on the second location information, wherein the second zoom sequence comprises a second plurality of mapped images of the second location from a second plurality of zoom levels, and
    wherein the second plurality of mapped images are sequentially ordered by a magnitude of the zoom level.

4. The method of claim 3, further comprising:
    outputting, for display, the different one or more images.

5. The method of claim 3, wherein the second plurality of zoom levels is the same as the first plurality of zoom levels.

6. The method of claim 1, wherein each zoom level of the plurality of different zoom levels is associated with a different magnification.

7. The method of claim 1, further comprising:
    compiling a slideshow presentation comprising the one or more images and the first zoom sequence, wherein compiling the slideshow presentation comprises inserting the one or more images and the first zoom sequence into a single digital file.

8. A non-transitory computer-readable medium encoded with a computer program, the computer program comprising computer-executable instructions that when executed by a computer having at least one processor causes the computer to perform a method comprising:
    determining first location information from first metadata associated with one or more images, wherein the first location information identifies a first location where the one or more images were captured; and
    outputting, for display, a first zoom sequence based on the first location information, wherein the first zoom sequence comprises a video comprising a first plurality of mapped images of the first location from a first plurality of zoom levels, and wherein the plurality of mapped images are sequentially ordered by a magnitude of the zoom level.

9. The non-transitory computer-readable medium of claim 8, wherein the computer-executable instructions, when executed by the computer, cause the computer to perform the method comprising the additional step of:
    outputting, for display, the one or more images.

10. The non-transitory computer-readable medium of claim 8, wherein the computer-executable instructions, when executed by the computer, cause the computer to perform the method comprising the additional steps of:
    determining second location information from second metadata associated with different one or more images, wherein the second location information identifies a second location; and outputting, for display, a second zoom sequence based on the second location information, wherein the second zoom sequence comprises a second plurality of mapped images of the second location from a second plurality of zoom levels, and wherein the second plurality of mapped images are sequentially ordered by a magnitude of the zoom level.

11. The non-transitory computer-readable medium of claim 10, wherein the computer-executable instructions, when executed by the computer, cause the computer to perform the method comprising the additional step of:
outputting, for display, the different one or more images.

12. The non-transitory computer-readable medium of claim 10, wherein the second plurality of zoom levels is the same as the first plurality of zoom levels.

13. The non-transitory computer-readable medium of claim 8, wherein the computer-executable instructions, when executed by the computer, cause the computer to perform the method comprising the additional step of:
compiling a slideshow presentation comprising the one or more images and the first zoom sequence, wherein compiling the slideshow presentation comprises inserting the one or more images and the first zoom sequence into a single digital file.

14. A system comprising:
memory comprising executable instructions;
a processor operatively connected to the memory, the processor configured to execute the executable instructions in order to effectuate a method comprising:
determining first location information from first metadata associated with one or more images, wherein the first location information identifies a first location where the one or more images were captured; and
outputting, for display, a first zoom sequence based on the first location information,
wherein the first zoom sequence comprises a video comprising a first plurality of mapped images of the first location from a first plurality of zoom levels, and wherein the plurality of mapped images are sequentially ordered by a magnitude of the zoom level.

15. The system of claim 14, wherein the processor is configured to execute the executable instructions in order to effectuate the method further comprising:
outputting, for display, the one or more images.

16. The system of claim 14, wherein the processor is configured to execute the executable instructions in order to effectuate the method further comprising:
determining second location information from second metadata associated with different one or more images, wherein the second location information identifies a second location; and
outputting, for display, a second zoom sequence based on the second location information, wherein the second zoom sequence comprises a second plurality of mapped images of the second location from a second plurality of zoom levels, and
wherein the second plurality of mapped images are sequentially ordered by a magnitude of the zoom level.

17. The system of claim 16, wherein the processor is configured to execute the executable instructions in order to effectuate the method further comprising:
outputting, for display, the different one or more images.

18. The system of claim 16, wherein the second plurality of zoom levels is the same as the first plurality of zoom levels.

19. The system of claim 14, wherein each zoom level of the plurality of zoom levels is associated with a different magnification.

20. The system of claim 14, wherein the processor is configured to execute the executable instructions in order to effectuate the method further comprising:
compiling a slideshow presentation comprising the one or more images and the first zoom sequence, wherein compiling the slideshow presentation comprises inserting the one or more images and the first zoom sequence into a single digital file.

* * * * *